United States Patent [19]

Dinges

[11] 3,737,886
[45] June 5, 1973

[54] APPARATUS FOR MONITORING LIQUID FLOW

[75] Inventor: Wolfgang Dinges, Dusseldorf, Germany

[73] Assignee: Lacoray S.A., Geneva, Switzerland

[22] Filed: Aug. 20, 1971

[21] Appl. No.: 173,378

[30] Foreign Application Priority Data

Sept. 2, 1970 Switzerland.......................13080/70

[52] U.S. Cl............340/244 R, 340/233, 340/239 R, 73/398 AR
[51] Int. Cl..............................................G08b 21/00
[58] Field of Search...........................340/240, 239 R; 73/398 AR

[56] References Cited

UNITED STATES PATENTS 2,828,479  3/1958  Jackson............................340/239 R
3,007,414  11/1961  Long.................................340/239 R
3,128,628  4/1964  Lebow..............................73/398 AR
3,130,586  4/1964  Taylor..............................73/398 AR Primary Examiner—Thomas B. Habecker
Attorney—Irvin S. Thompson and Robert J. Patch

[57] ABSTRACT

Apparatus for monitoring liquid flow comprises two resistance strain gauges in a pipe arranged one above the other and an electronic alarm circuit including the strain gauges and comparing their readings to actuate an alarm when the liquid content of a generally horizontal pipe in which the gauges are installed, falls below a predetermined minimum. The liquid in the pipe has a gravity-defined surface, and the alarm is thus an indication of the position of that surface vertically between the strain gauges.

7 Claims, 2 Drawing Figures

APPARATUS FOR MONITORING LIQUID FLOW

The present invention relates to apparatus for monitoring liquid flow, more particularly in a conduit, and for giving an alarm when the liquid flow rate falls below a predetermined minimum.

Such devices are already known and they can therefore be subdivided into the following distinct principal classes:

a. Meters provided with inspection flaps with attached contact equipment.

These devices can, however, only function with absolutely clean liquids.

b. Rotameters (or variable-area flowmeters) with attached contact equipment.

These instruments also can only be used for absolutely clean liquids.

c. Flowmeters such as oscillating piston flowmeters and turbine flowmeters.

These instruments in their turn are only suitable for absolutely clean liquids.

To this category belong also the inductive flowmeters which admittedly are suitable for contaminated liquids but only for those liquids which are electrically conductive.

The object of this invention is to produce a cheap device which is suitable for flows of clean or contaminated, electrically conductive or insulating liquids.

The monitoring of liquid flows according to the invention is characterized by the fact that in a non vertical pipe two pressure detectors are installed in different horizontal planes which will trip an alarm by comparison of their outputs if a given flow value is not attained.

The automatic flow monitor according to the invention is characterized by the fact that it comprises two resistance strain gauges, which are installed in a pipe and arranged one above the other and by the fact that an electronic alarm circuit supplies the resistance strain gauges, compares their data and trips an alarm system as soon as the liquid content of the pipe falls below a specified nominal value.

The attached drawing shows the form of construction of an automatic flow monitor in accordance with the invention by way of example.

Figure 1:
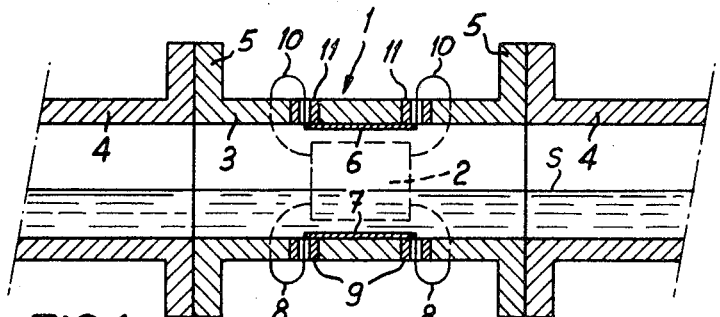
FIG. 1 is a diagrammatic representation of the automatic flow monitor in a pipe.
Figure 2:
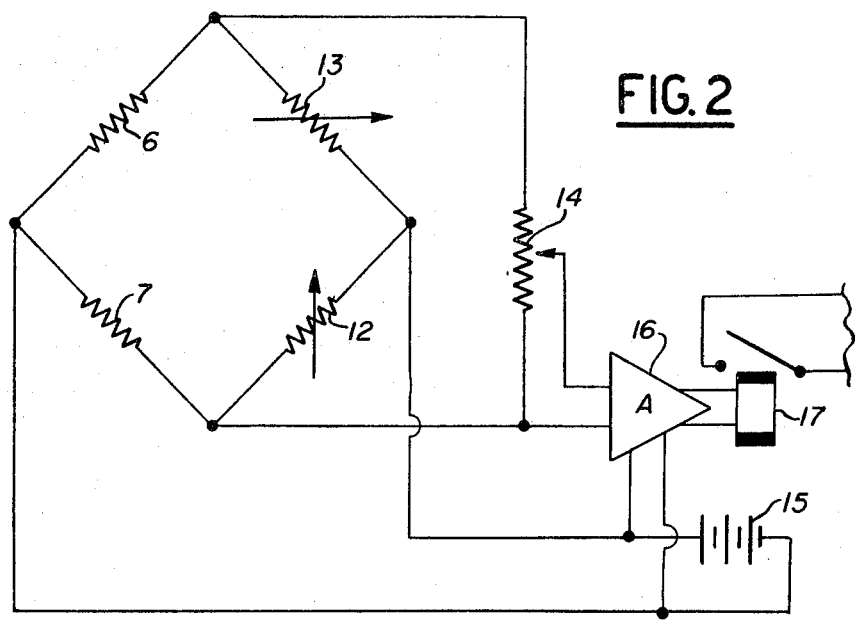
FIG. 2 shows a switching network of the electronic part of the automatic flow monitor.

The automatic flow monitor can be installed in any pipe, but for practical reasons it will be fitted into a short pipe length which belongs to the device and which can be inserted by flange-mounting into any pipe as an integral component.

The automatic flow monitor in accordance with the illustrated version consists of a primary appliance 1 and an attached electronic alarm circuit 2.

The primary appliance 1 consists of a pipe length 3 of steel, stainless steel, plastic material, glass or any desired material and it is usually composed of the same material as the pipe 4 in which it is installed. This pipe length has preferably a length of approximately 40 cm and it is fitted at both ends with flanges 5 which enable its installation in the pipe 4. The manufacture of the appliance for all commercial nominal bores and nominal pressure stages is contemplated.

The pipe length 3 contains on the inside two resistance strain gauges 6, 7 which are preferably displaced by 180° from each other. These two resistance strain gauges 6, 7 will be attached to the inside wall of the pipe 3 by means of casting resin or adhesive in accordance with the flow medium and pipe material, and possibly protected against aggressive flowing media by a sealing film, which may consist for instance of Teflon.

The two resistance strain gauges 6, 7 can be sunk into the internal pipe wall, if desired, so that the pipe 3 has a smooth inside wall. The sealing film may consist in this case of a tubular internal lining of the pipe length 3. It has to be ensured however that the sealing film will not prevent the transfer of the hydrostatic pressure to the resistance strain gauges; this sealing film has accordingly to be sufficiently thin or elastic.

The connecting ends 8, 10 of the resistance strain gauge pass through the pipewall through holes 9, 11 which may be lined with glass, ceramic or similar material. These glass linings are of course leakproof so that the passing medium cannot escape here. These connecting ends 8, 10 are taken to the alarm switching circuit 2 and electrically connected. This alarm switching circuit 2 is attached to the pipe length 3 — approximately in the middle of this pipe — and displaced by 90° in relation to the resistance strain gauges. As far as the installation of the pipe length 3 in the pipe 4 is concerned care has to be taken to ensure that the two resistance strain gauges 6, 7 do not lie in a horizontal plane but that they are preferably placed vertically in a plane. During conditions of reduced flow, therefore, the gauge 6 will lie above and the gauge 7 will lie below the gravity-defined surface S of the liquid in the pipe. In addition to the strain experienced by gauge 6, the gauge 7 will experience a strain which varies as the height of surface S above gauge 7. This added strain will of course diminish as level S falls, and so an alarm can be triggered when the difference in the strain of gauges 6 and 7 falls below a predetermined minimum corresponding to the fall of surface S below a predetermined level.

Both resistance strain gauges 6, 7 are elements of a Wheatstone bridge of the alarm circuit 2, the two other bridge resistances 12, 13 of which are formed by potentiometers which are in the switching circuit 2. The Wheatstone bridge as well as the direct current amplifier 16 are supplied by the same source of current 15; this can be effected by a battery or by a powerpack installed in the amplifier. The output bridge diagonal is connected with a potentiometer 14 which transmits a variable voltage drop corresponding to the wiper setting to the input of a transistorized direct current amplifier 16. A relay 17, for instance a miniature relay, is connected in the amplifier output which will be excited at the drive of the amplifier and which serves for the operation of the alarm.

The automatic flow monitor as described above functions as follows:

The pipe length 3 will be installed in the pipe 4, which is to be monitored, in such a way that the resistance strain gauges 7 is placed underneath the other resistance strain gauge 6. The resistance strain gauge 7 should preferably be placed at the lowest point and the resistance strain gauge 6 at the highest point in the pipe.

The resistance strain gauge 7 is the actual measuring rheostat which varies its resistance value in accordance with the liquid head standing on it and which causes in this way unbalancing of the Wheatstone bridge. The second resistance strain gauge 6 which is found at the top of the pipe serves jointly with 7 only for the compensation of the medium pressure and of the medium temperature since, when the pipe 3 is filled, the pressure of the medium causes the same resistance change at both resistance strain gauges 6, 7; the bridge equilibrium will be maintained in this way but the equilibrium will be disturbed by the liquid column — which stands on the resistance 7 — flowing through pipe 3. In the case of full pipe 4 and the correspondingly full appliance 3 the equilibrium of the Wheatstone bridge with the two bridge potentiometers 12 and 13, will be disturbed to such an extent that a voltage drop will occur at the input potentiometer 14 of the amplifier 16 which fully modulates the amplifier 16 and excites the output relay 17. The responsiveness of the amplifier 16 can be regulated with the input potentiometer 14. The unbalancing of the bridge will be adjusted in such a way that in the event of any critical minimum flow the amplifier 16 will no longer modulate and that consequently the output relay 17 drops out. This means that an alarm condition also exists in the case of a very small flow or flow zero (pipe empty) since the output relay 17 is not excited. The same alarm condition exists in the case of a fault in the appliance and automatic control is ensured in this way. If, in the event of an incompletely filled pipe 3, the flow will pulsate severely (wave form which would fall partly below the minimum cut-off point) and switching corresponding to the flow fluctuation would occur. This can be prevented, however, by an RC-element in the exciting circuit of the relay 17; the time constant would be set to about 1 to 2 seconds and any undesired switching is consequently prevented.

The principal advantages of the desired automatic flow monitor are the following:

a. Its design and construction are very simple; it only consists of a pipe length and an electronic part which is attached to this.

b. There are no movable mechanical parts.

c. It is suitable for extremely contaminated liquids and it is very robust.

d. It is suitable for all kinds of liquids, even for highly abrasive ones. It is only essential to use suitable resistant pipe material or a suitable internal lining of pipe 3 which may consist of rubber, "Teflon" or any other material.

e. No pressure loss will arise since the appliance has the same nominal width as the pipe and since none of its components can obstruct the liquid.

f. The alarm system will be tripped independently of the pressure of the flowing medium since automatic pressure compensation is provided.

g. The tripping of the alarm system can be set between 0 and 100 percent flow without any difficulties at the operating site.

h. The automatic flow controller can function with an operating voltage of under 24V (for instance 6 V and 10 mA maximum) since the amplifier is transistorized. The inherent safety of the appliance and its additional use for explosive media or its use in confined spaces liable to contain explosive mixtures is therefore ensured.

i. The installation of the appliance is simple since it will only be necessary to connect its flanges with the pipe flanges.

j. The appliance does not require any maintenance since it does not comprise any mechanically removable parts.

It is of course possible to produce a number of modifications of the appliance. These modifications will, however, fall within the scope of the present invention in case these methods provide for the use of two pressure detectors situated in different horizontal planes of a non vertical pipe and if the utilization of the output information of these two pressure detectors will operate the alarm system.

The pipe could be lined for instance with rubber, Teflon or any similar material. The resistance strain gauges would be fixed in this case over the lining.

The resistance strain gauges could also be fitted and secured in two boreholes of the pipe and be separated from the medium by membranes, bellows or similar materials.

The primary appliance in one of the modifications could be formed by two measuring heads which are installed in the pipe by means of flanges. The measuring heads can also be screwed into the pipe. The resistance strain gauges are also in this instance separated from the medium since they are separated on the back by membranes, bellows, quartz crystal disks or similar materials.

I claim:

1. Apparatus for monitoring the flow of a liquid having a gravity-defined surface, comprising a non-vertical pipe section, a pair of resistance strain gauges disposed on the inside of the pipe section adjacent each other and one higher than the other, and electric means responsive to a difference in strain of said strain gauges less than a predetermined minimum difference for giving an indication of reduced liquid flow according to the position of said surface between said strain gauges.

2. Apparatus as claimed in claim 1, said strain gauges being on the inner wall of said pipe section.

3. Apparatus as claimed in claim 1, said strain gauges being one above the other at the uppermost and lowermost portions of the inner side wall of the pipe section.

4. Apparatus as claimed in claim 1, said pipe section having flanges at its ends for attachment in a piping system.

5. Apparatus as claimed in claim 1, said resistance strain gauges having electrical connections at their opposite ends, said electrical connections passing through leakproof seals through the side wall of the pipe section and being connected to said electric means outside said pipe section.

6. Apparatus as claimed in claim 1, said resistance strain gauges being disposed in adjacent arms of a Wheatstone bridge, and potentiometers in the other arms of said Wheatstone bridge.

7. Apparatus as claimed in claim 6, and a further potentiometer in circuit with an output of said Wheatstone bridge to control a direct current amplifier the output of which modulates a relay in said electric means.

* * * * *